United States Patent
Philip et al.

(10) Patent No.: US 12,482,245 B2
(45) Date of Patent: Nov. 25, 2025

(54) SYSTEM AND METHOD FOR PERSONALIZING A COMPUTER VISION MODEL BASED ON USE CASES

(71) Applicant: ASSERT SECURE TECH PVT. LIMITED, Mumbai (IN)

(72) Inventors: Job Varughese Philip, Mumbai (IN); Harshit Bhatia, New Delhi (IN); Happy Mishra, Vadodara (IN)

(73) Assignee: ASSERT SECURE TECH PVT. LIMITED, Mumbai (IN)

(*) Notice: Subject to any disclaimer, the term of this patent is extended or adjusted under 35 U.S.C. 154(b) by 0 days.

(21) Appl. No.: 19/043,073

(22) Filed: Jan. 31, 2025

(65) Prior Publication Data

US 2025/0252720 A1    Aug. 7, 2025

(30) Foreign Application Priority Data

Feb. 1, 2024   (IN) .............................. 202421006710

(51) Int. Cl.
  *G06V 10/778*   (2022.01)
  *G06V 10/26*    (2022.01)

(52) U.S. Cl.
  CPC .......... *G06V 10/7788* (2022.01); *G06V 10/26* (2022.01)

(58) Field of Classification Search
  CPC .......................... G06V 10/7788; G06V 10/26
  See application file for complete search history.

(56) References Cited

U.S. PATENT DOCUMENTS

| | | | |
|---|---|---|---|
| 2014/0058725 A1* | 2/2014 | Longe | G06F 3/04886 704/9 |
| 2015/0015579 A1* | 1/2015 | Brown | G06F 11/36 345/419 |
| 2017/0104957 A1* | 4/2017 | Farrell | H04N 7/147 |
| 2017/0310830 A1* | 10/2017 | Kemmochi | G06F 3/03545 |
| 2019/0246165 A1* | 8/2019 | Brouwer | H04N 21/435 |
| 2022/0237897 A1* | 7/2022 | Heinzemann | G06T 7/35 |
| 2022/0385810 A1* | 12/2022 | Pan | H04N 23/698 |
| 2022/0414136 A1* | 12/2022 | Jones | G06N 20/00 |
| 2023/0230298 A1* | 7/2023 | Anderson | G06T 11/008 345/419 |
| 2023/0230378 A1* | 7/2023 | Rufenacht | G06V 20/47 382/100 |
| 2023/0326091 A1* | 10/2023 | Meyer | G06V 20/58 |
| 2023/0395096 A1* | 12/2023 | Kumar | G06V 20/40 |
| 2024/0054786 A1* | 2/2024 | Andresen | H04N 5/2628 |

(Continued)

*Primary Examiner* — Ming Y Hon

(57) ABSTRACT

A system for personalizing a computer vision (CV) model based on use cases is provided. The method includes (i) segmenting media content received from a user device into a sequence of individual frames, (ii) extracting a first frame, (iii) providing a plurality of preference segments to the user device to enable the user to select a preference, (iv) generating an event by enabling the user to interact with the first frame using a mouse, (v) configuring the CV model automatically, (vi) converting the one or more mouse clicks performed on the first frame into coordinates, (vi) converting the input into a compatible format by processing the input of the user with every click of 'y' or 'q' by the user on the keyboard, (vii) personalizing the CV model based on use cases by crystalizing the input of the CV model to perform interpretation/prediction, upon receiving confirmation from the user.

10 Claims, 7 Drawing Sheets

(56) References Cited

U.S. PATENT DOCUMENTS

| | | | |
|---|---|---|---|
| 2024/0257383 A1* | 8/2024 | Kvamstad | H04N 5/2628 |
| 2025/0014142 A1* | 1/2025 | Van | G06F 3/04845 |
| 2025/0029381 A1* | 1/2025 | Huang | G06V 10/25 |
| 2025/0118014 A1* | 4/2025 | Patton | G06T 15/30 |

\* cited by examiner

SYSTEM AND METHOD FOR PERSONALIZING A COMPUTER VISION MODEL BASED ON USE CASES

BACKGROUND

Technical Field

The embodiments herein generally relate to Computer Vision (CV) models, more particularly to a system and a method for personalizing a computer vision (CV) model based on use cases.

Description of the Related Art

Computer Vision (CV) artificial intelligence (AI) models are a subset of artificial intelligence (AI) that focuses on enabling machines to interpret and understand visual information from the world, much like the human visual system. The CV models leverage complex algorithms and deep learning techniques to extract meaningful insights from images or video data. The CV models involve image processing techniques to enhance, analyze, and extract relevant features from visual data. This may include operations such as filtering, edge detection, and image enhancement. The CV models use advanced algorithms to identify and extract key features from images, enabling them to recognize patterns, objects, or specific attributes within the visual data. Object recognition is a crucial aspect of the CV models. It involves training models to identify and classify objects within images or video streams. Convolutional Neural Networks (CNNs) are commonly used for this purpose. Image classification is the process of categorizing images into predefined classes or labels. The CV models can be trained to classify images based on the presence of specific objects, scenes, or characteristics. Semantic segmentation involves dividing an image into segments and assigning each segment a specific label. This is particularly useful for understanding the context and relationships between different elements in an image. Object detection goes beyond classification by not only identifying objects in an image but also outlining their spatial locations. This is crucial for applications such as autonomous vehicles and surveillance systems.

The CV model is integral to the development of autonomous vehicles, enabling them to perceive and respond to the surrounding environment, identify obstacles, and navigate safely. In healthcare, the CV models contribute to medical image analysis, aiding in the diagnosis of diseases, detection of anomalies in medical scans, and even assisting in surgical procedures. CV is utilized for inventory management, facial recognition for personalized shopping experiences, and visual search capabilities in e-commerce platforms. Surveillance systems leverage CV models for facial recognition, object tracking, and anomaly detection to enhance security measures. CV model is employed in manufacturing for quality control, defect detection, and monitoring production processes to ensure consistency and efficiency. Augmented Reality (AR) and Virtual Reality (VR) applications rely on the CV model to overlay digital information onto the real-world environment, creating immersive experiences.

Understanding the decisions made by complex CV models can be challenging, raising concerns about interpretability and explainability. As technology advances, the Computer Vision AI models continue to evolve, contributing to advancements across various industries and playing a pivotal role in reshaping how machines perceive and interact with the visual world.

Non-technical users currently lack accessible avenues to run the Computer Vision AI models. The existing methods or platforms may require a certain level of technical proficiency, creating a barrier for individuals without a coding background. The execution of CV models typically demands a certain level of coding knowledge. This technical barrier can limit the participation of non-technical users who may have valuable insights or applications in mind but lack the programming skills required for model deployment.

The existing solutions for running the CV models may not be tailored to meet the specific requirements of various industries, such as retail or warehouse management. The lack of specialization can hinder the effective application of CV models in these domains.

The non-technical users face challenges in comprehending and visualizing the CV models and their potential applications. The absence of user-friendly tools or platforms that provide intuitive insights into the workings and applications of these models further complicates the adoption process.

Hence, the identified issues highlight the need for a novel solution that addresses the interpretation, accessibility, ease of use, and industry-specific applicability of Computer Vision AI models.

SUMMARY

In view of the foregoing, an embodiment herein provides a method for personalizing a computer vision (CV) model based on use cases. The method includes segmenting media content received from a user device associated with a user into a sequence of individual frames, where the media content includes video uploaded by the user. The method includes extracting, a first frame from the sequence of individual frames. The method includes providing a plurality of preference segments to the user device to enable the user to select a preference to initiate a process in the first frame, where the user can select one or more use cases from the plurality of preference segments. The method includes generating an event by enabling the user to interact with the first frame using a mouse by performing one or more mouse clicks, where a left mouse button is pressed down during the one or more mouse clicks. The method includes configuring the CV model automatically that is specific to the selected use case based on the generated event. The method includes converting one or more mouse clicks performed on the first frame into coordinates and storing the coordinates in a predefined format in a database, where the database comprises a first module and a second module. The method includes enabling the user to select or provide an input to accept or discard a change in the first frame. The method includes converting the input into a compatible format by processing the input of the user with every click of 'y' or 'q' by the user on the keyboard, or discarding the input. The method includes personalizing the CV model based on use cases by crystalizing the input of the CV model and defining the CV model based on the crystalized input to enable the CV model to perform interpretation/prediction, upon receiving confirmation from the user. In some embodiments, P re-processing the first frame using at least one of pre-processing techniques to match a specific shape, size, and dimensions suitable for display on the user device.

In some embodiments, the first frame is standardized to a predetermined format to enable tracking of click event coordinates.

In some embodiments, the media content of the predefined areas of the entity is captured using an image capturing device.

In some embodiments, the CV model is modularized to ensure that each part is connected in a pipeline, with the output from one stage passed to the next and any disruption in the pipeline triggers an appropriate error message.

In some embodiments, the first module serves as temporary storage, while the second module acts as permanent storage.

In some embodiments, the method includes pressing 'y' on the keyboard stores the coordinates to the second module and the pressing 'q' on the keyboard stores the coordinates to the first module.

In some embodiments, the coordinates are stored in a hierarchical structure based on how they are stacked in the database.

In some embodiments, a system for personalizing a computer vision (CV) model based on use cases. The system includes a server. The server includes a memory and a processor. The memory includes set of instructions and the processor executes the set of instructions. The processor is configured to segment media content received from a user device associated with a user into a sequence of individual frames. The media content includes video uploaded by the user. The processor is configured to extract a first frame from the sequence of individual frames. The processor is configured to provide a plurality of preference segments to the user device to enable the user to select a preference to initiate a process in the first frame, wherein the user can select one or more use cases from the plurality of preference segments. The processor is configured to generate an event by enabling the user to interact with the first frame using a mouse by performing one or more mouse clicks, where a left mouse button is pressed down during the one or more mouse clicks. The processor is configured to configure the CV model automatically that is specific to the selected use case based on the generated event. The processor is configured to convert one or more mouse clicks performed on the first frame into coordinates and storing the coordinates in a predefined format in a database, where the database comprises a first module and a second module. The processor is configured to enable the user to select or provide an input to accept or discard a change in the first frame. The processor is configured to Convert the input into the format by processing the input of the user with every click of 'y' or 'q' by the user on the keyboard, or discarding the input. The processor is configured to personalize the CV model based on use cases by crystalizing the input of the CV model and defining the CV model based on the crystalized input to enable the CV model to perform interpretation/prediction, upon receiving confirmation from the user.

In some embodiments, the processor is configured to Pre-process the first frame using at least one of pre-processing techniques to match a specific shape, size, and dimensions suitable for display on the user device.

The system allows users to personalize a computer vision model without coding, offering ease of use, faster implementation, and cost efficiency, making AI accessible to non-technical users. No-code platforms provide drag-and-drop interfaces, enabling users to train models with their own images and customize them for specific needs. These solutions integrate seamlessly with business tools, support cloud deployment for scalability, and enable real-time analysis without requiring advanced hardware. By reducing reliance on AI developers and offering pay-as-you-go options, the system empowers businesses to harness AI for automation, quality control, and other industry-specific applications.

The system allows users to easily interpret and analyze results, providing a clear understanding of the model's performance without requiring coding expertise or technical knowledge. It offers flexibility in handling video input sources, enabling users to run computer vision models on default videos, upload their own, or input camera details. This adaptability ensures seamless access to advanced computer vision capabilities within a no-code framework. With an intuitive interface, users can effortlessly customize AI applications to meet their specific needs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
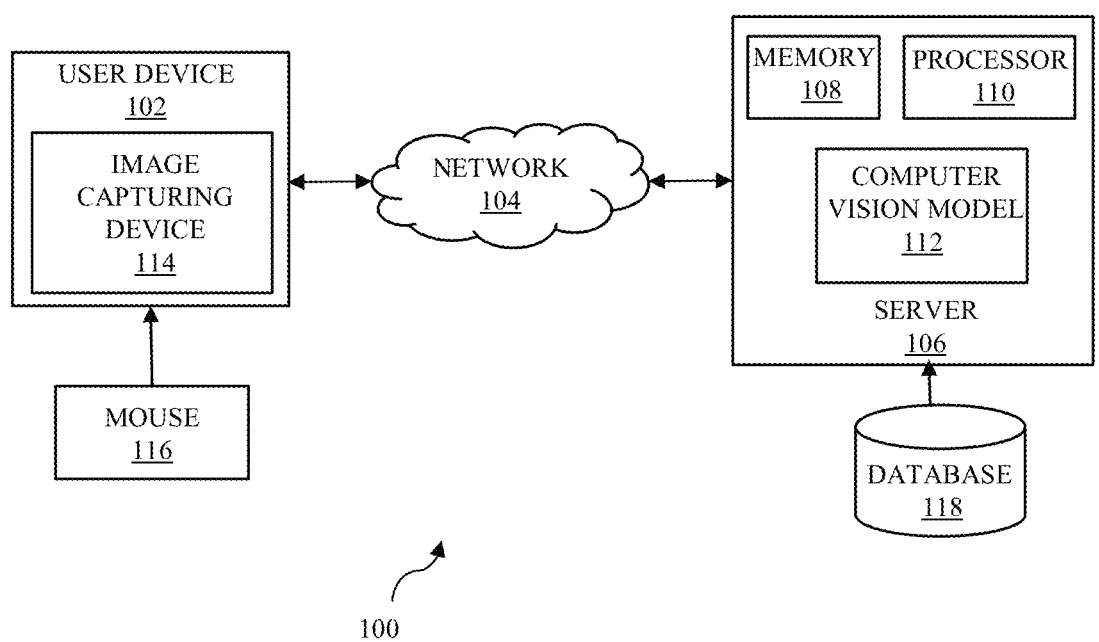
FIG. 1 illustrates a block diagram of a system for personalizing a computer vision (CV) model based on use cases according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method for personalizing a computer vision (CV) model based on use cases. Various embodiments disclosed herein provide a system and a method for personalizing a computer vision (CV) model based on use cases. Referring now to the drawings, and more particularly FIG. 1 through FIG. 5, where similar reference characters denote corresponding features consistently throughout the figures, preferred embodiments are shown.

The term "Computer Vision Model" refers to an AI-driven system designed to analyze and interpret visual data from images or videos, enabling tasks such as object detection, facial recognition, motion tracking, and image classification. These models leverage machine learning and deep learning techniques to extract meaningful insights, automate visual inspections, and enhance decision-making across various industries, including healthcare, retail, manufacturing, and security.

The term "Artificial Intelligence (AI)" refers to the simulation of human intelligence in machines, enabling them to perform tasks such as learning, reasoning, problem-solving, perception, and language understanding. AI systems use algorithms and data to recognize patterns, make decisions, and improve over time without explicit programming. AI is widely applied in various fields, including automation, healthcare, finance, robotics, and customer service, enhancing efficiency and enabling intelligent decision-making.

The term "use case" refers to a specific scenario or application in which a system, technology, or process is utilized to achieve a particular goal. It defines how users interact with a system to accomplish tasks, outlining the steps, inputs, and expected outcomes. Use cases are commonly used in software development, business analysis, and technology adoption to illustrate real-world applications, such as using a computer vision model for automated quality inspection in manufacturing or AI-driven chatbots for customer support.

FIG. 1 illustrates a block diagram of a system 100 for personalizing a computer vision (CV) model based on use cases according to an embodiment herein. The system 100 includes a user device 102, a network 104, a server 106, a mouse 116 and a database 118. The user device 102 includes an image capturing device 114 and connect to the mouse 116. The media content captured using the image capturing device 114 and shared to the server 106 over the network 104. The media content may be a video, one or more images, or live streams from Real-Time Streaming Protocol (RTSP) cameras.

The user device 102 may be a handheld device, a mobile phone, a kindle, a Personal Digital Assistant (PDA), a tablet, a laptop, a desktop computer, a wearable device, an electronic notebook, a smartphone, a stationary device, a partially-stationary device or a non-traditional user device 102 like IoT nodes. The image-capturing device 114 may be a camera. In some embodiments, the network 104 is a wired network or a wireless network. In some embodiments, the network 104 is a combination of a wired and wireless network. In some embodiments, the network 104 is Internet. The server 106 includes a memory 108 that stores a database 118, a processor 110 that executes a set of instructions, and the Computer Vision (CV) model 112 that is implemented on the server 106. The database 118 may store one or more sequences of instructions. The server 106 is configured to receive the media content from the user device 102 through the network 104.

In some embodiments, the processor 110 is configured to segment media content received from a user device 102 associated with a user into a sequence of individual frames. The media content comprises video uploaded by the user using the image capturing device 114 and extract a first frame from the sequence of individual frames. wherein the first frame is standardized to a predetermined format to enable tracking of click event coordinates.

In some embodiments, The processor 110 is configured to provide a plurality of preference segments to the user device 102 to enable the user to select a preference to initiate a process in the first frame. The user can select one or more use cases from the plurality of preference (e.g. a retail or a toll road or an industrial setup). The media content may be a video or image or both. A theft and a fraud prevention and queue optimization can be categorized as retail industry use cases.

In some embodiments, The processor 110 is configured to generate an event by enabling the user to interact with the first frame using a mouse 116 by performing one or more mouse clicks. The event is triggered when the left mouse button is pressed down during one or more mouse clicks. The coordinates are stored in a hierarchical structure based on how they are stacked in the database 118.

In some embodiments, The processor 110 configures the CV model automatically that is specific to the selected use case based on the generated event.

In some embodiments, The processor 110 is configured to convert one or more mouse clicks performed on the first frame into coordinates and storing the coordinates in a predefined format in a database 118. The database 118 includes a first module and a second module. The first module is the first module serves as temporary storage, while the second module acts as permanent storage.

In some embodiments, The processor 110 is configured to convert the input into the format by processing the input of the user with every click of 'y' or 'q' by the user on the keyboard, or discarding the input. For example, the input includes 'y' for accepting a change and 'q' for discarding and restarting a change using a keyboard of the user. The processor 110 processes the input of the user with every click of 'y' or 'q' by the user on the keyboard, or discarding the input. The processor 110 converts the input in a format that the computer vision model 112 requires. Upon receiving a confirmation from the user, the computer vision model 112 is configured by crystalizing the input of the CV model 112 and defining the CV model 112 based on the crystalized input to enable the CV model 112 to perform interpretation/prediction.

In some embodiments, The processor 110 is configured to personalize the CV model based on use cases by crystalizing the input of the CV model and defining the CV model based on the crystalized input to enable the CV model to perform interpretation/prediction, upon receiving confirmation from the user.

In some embodiments, the processor 110 trains the CV model 112 using proprietary data. In some embodiments, the processor 110 displays the CV model 112 in a display of the user device 102 to enable the user to interact with the CV model 112. For example, the CV model 112 is displayed on the user devices 102 on its display, dashboard, browser, or application. In some embodiments, the processor 110 enables the user to access the user device 102 populated with a video.

In some embodiments, the processor 110 organizes metadata associated with the video that is received from the CV model 112 in the database 118 the user device 102 with a relevant email-id or a mobile app. In some embodiments, the processor 110 enables the user to access the user device 102 with the relevant email ID or a login and a password.

In some embodiments, the first frame of the video is displayed in the user interface for user inputs by pre-processing the first frame to adhere to a specific shape, size, and dimensions of the display of the user device 102.

In some embodiments, after displaying the first frame of the video on the user device 102, the processor 110 waits for a trigger event and generates the trigger event when a left mouse button of the mouse 116 is clicked by the user on the user device 102. Upon detecting the left mouse click, the computer vision model 112 is configured to track a location/coordinates in the first frame where the mouse click is performed by the user. The first frame/image of the video is pre-processed to standardize its shape and size, aligning with a predetermined format for tracking click event coordinates. In some embodiments, the user is prompted to click between 4-6 times per step, aligning with the requirements of the relevant computer vision model 112.

The system 100 offers an end-to-end no-code solution, allowing the users to seamlessly run/configure computer vision models without the need for programming expertise. The entire process is simplified from model deployment to execution. The system 100 specifically executes computer vision model 112 on videos. This system 100 expands the application of AI models beyond static images, catering to the dynamic nature of video data. Users can effortlessly define their rules, regions of interest, and use cases without delving into code. The user interface enables users to specify parameters through simple clicks and mouse 116 drags, fostering a no-code environment for customization. The system 100 offers flexibility in handling video input sources. Users can seamlessly run computer vision models on default videos, upload their videos, or provide camera details. This adaptability ensures users can leverage the best computer vision models effortlessly, all within a no-code framework. Users have the power to customize their AI applications intuitively.

By utilizing mouse clicks and drags, the users can effortlessly interpret the media contents to define regions of interest, rules, and other parameters, empowering them to tailor AI models to their specific requirements. The system 100 not only runs/configures AI models but also provides a visual representation of their outputs. Users can easily comprehend and analyze the results, facilitating a deeper understanding of the model's performance without delving into complex coding or technical details. Users can run the most effective AI models by either utilizing default models integrated into the system, or uploading their models. This flexibility ensures that users can choose the best-suited models for their specific applications, contributing to enhanced performance and accuracy.

By eliminating the need for coding, the system 100 empowers a broader audience, including those without technical backgrounds. This democratization of AI usage ensures that individuals from various domains can harness the potential of computer vision without programming complexities. The system 100 seamlessly integrates user-defined inputs into the AI model pipeline. This ensures a smooth flow of information, allowing users to dictate the rules, regions of interest, and other parameters that influence the model's behavior, all within an intuitive no-code framework. Through a user-friendly interface, the system 100 offers visualization tools that enhance user understanding. Users can interact with the results, gaining insights and making informed decisions without grappling with the intricacies of coding.

Figure 2:
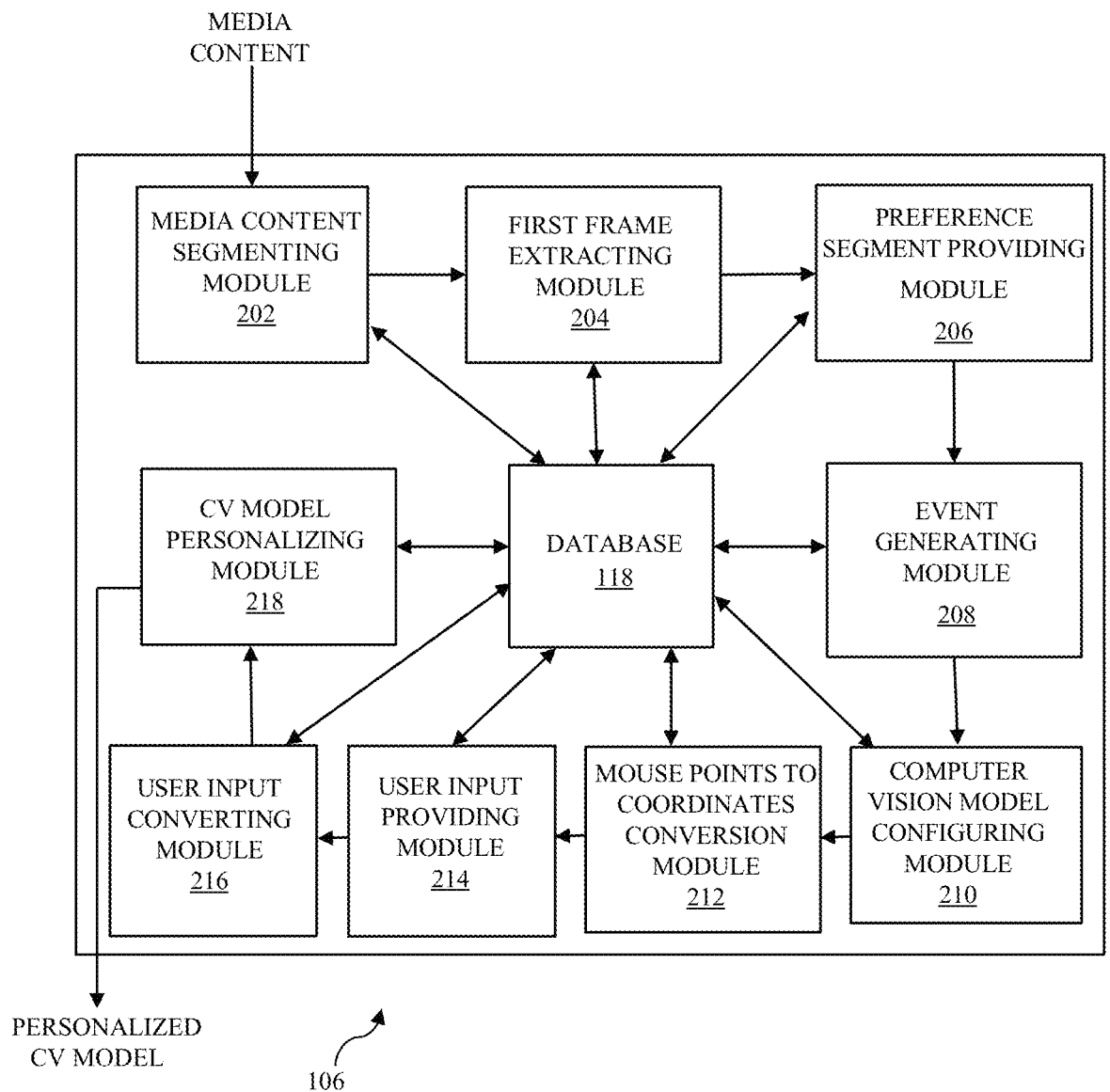
FIG. 2 illustrates a block diagram of a server of a system of FIG. 1 for personalizing a computer vision (CV) model based on use cases according to an embodiment herein.

FIG. 2 illustrates an exploded view of a server 106 of FIG. 1 for method for personalizing a computer vision (CV) model based on use cases according to an embodiment herein. The server 106 includes a media content segmenting module 202, a first frame extracting module 204, a preference segment providing module 206, an event generating module 208, a computer vision (CV) model configuring module 210, a mouse points to coordinates conversion module 212, a user input providing module 214, a user input converting module 216, and a CV personalizing module 218.

The media content segmenting module 202 processes media content by dividing it into multiple frames. This segmentation helps in analyzing, processing, or transmitting media efficiently by handling each frame separately. The first frame extracting module 204 retrieves an initial frame to initiate interaction with the user. The preference segment providing module 206 offers multiple preferences to the user, with each preference associated with multiple use cases. The event generating module 208 generates an event by enabling the user to interact with the first frame using a mouse 116 by performing one or more mouse clicks. The left mouse button is pressed down during the one or more mouse clicks. The computer vision (CV) model configuring module 210 configure the CV model automatically that is specific to the selected use case based on the generated event.

The mouse points to coordinates conversion module 212 converts the mouse points that is selected by the user on the frame into coordinates by keeping width and height of the first frame as reference and relative position of the mouse points to the first frame. The user input providing module 214 enable the user to select or provide an input to accept or discard a change in the first frame. The user input converting module 216 convert the input into the format by processing the input of the user with every click of 'y' or 'q' by the user on the keyboard, or discarding the input. When the user interacts with the first frame of the media contents provided on the user device 102, the user is enabled to select/provide an input to accept or discard a change in the at least one of the one or more frames of the media content appearing in the user device 102. For example, the input includes 'y' for accepting a change and 'q' for discarding and restarting a change using a keyboard of the user. The input of the user is processed with every click of 'y' or 'q' by the user on the keyboard, or discarding the input.

Figure 3A:
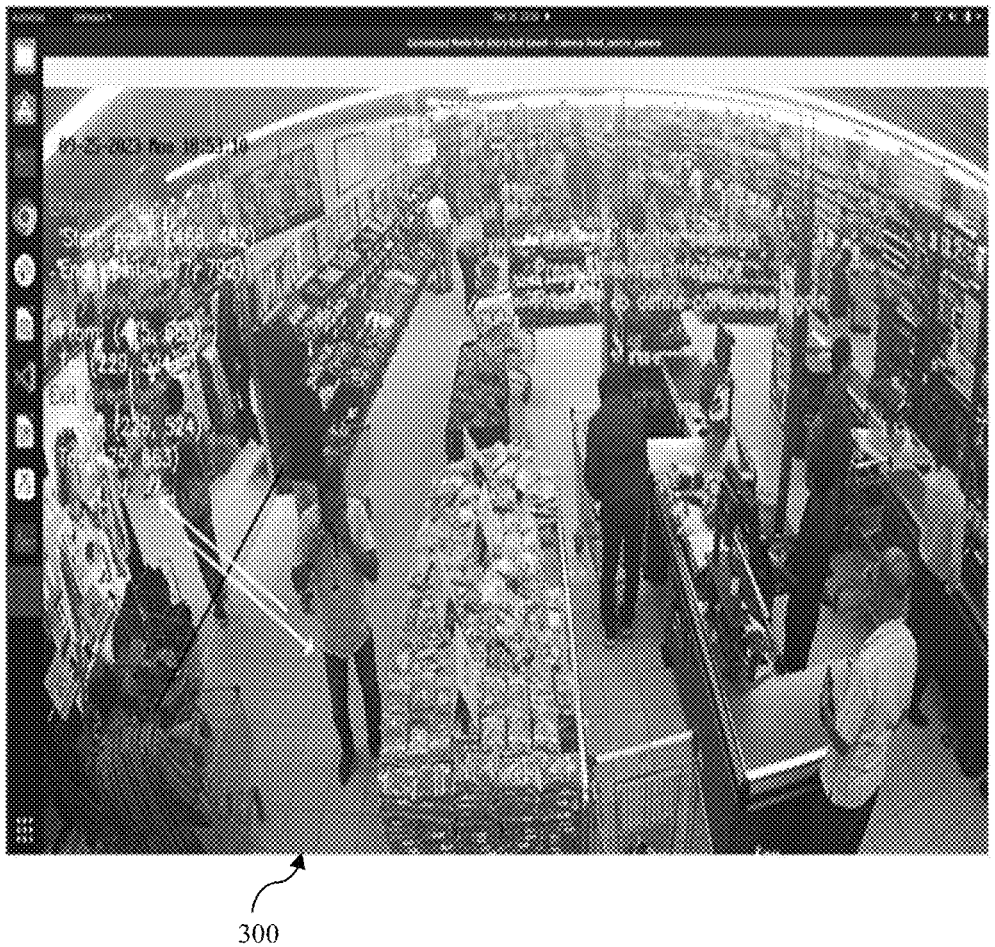
FIGS. 3A-3B illustrate exemplary views of a first frame from a video (e.g., a retail shop video) displayed on a user device using the system 100 of FIG. 1 according to an embodiment herein
Figure 3B:

FIGS. 3A-3B illustrate exemplary views of a first frame from a video (e.g., a retail shop video) displayed on a user device 102 using the system 100 of FIG. 1 according to an embodiment herein. The system 100 provides a plurality of preference segments (e.g. a retail or a toll road or an industrial setup) on a user interface (UI) of the user device 102 associated with a user. The system 100 provides one or more applications (e.g., entry-exit count, intrusion and queue) within the selected preference on the user interface to enable the user to select an application/usecase. For example, the user selects the entry-exit count as an application or example usecase for the retail shop using the system 100. The system 100 visualizes a first frame of a video (e.g., the retail shop video) using the user interface by extracting the first frame from the video using the computer vision model 112. The system 100 enables the user to interact with the first frame of the retail shop provided on the UI using a mouse 116 by performing one or more mouse clicks. The system 100 converts one or more mouse clicks performed on the first frame of the retail shop into coordinates and storing the coordinates in the database 118. FIG. 3A shows an entry-exit line and the direction to determine whether it is an entry or exit event. The system 100 determines four coordinates to determine the entry-exit line and the entry direction. The first two coordinates define the entry-exit line, while the third and fourth coordinates indicate the entry direction. The opposite direction of entry signifies the exit direction. In this example, the user is prompted to click four times, and these clicks are then stored in the database 118 for future reference. The computer vision (CV) model 112 accesses the database 118, retrieves the coordinates, and incorporates the coordinates into the respective CV model 112 to perform interpretation/prediction. Similarly, FIG. 3B shows an example application/usecase of a queue in the retail shop using the system 100.

When the user interacts with the first frame of the video provided on the UI, the user may select/provide an input to accept or discard a change in the first frame of the video appearing in the UI. For example, the input includes 'y' for accepting a change and 'q' for discarding and restarting a change using the keyboard of the user. The system 100 processes the input of the user with every click of 'y' or 'q' by the user on the keyboard, or discarding the input. The system 100 converts the input into a format that the computer vision model 112 requires.

Figure 4A:
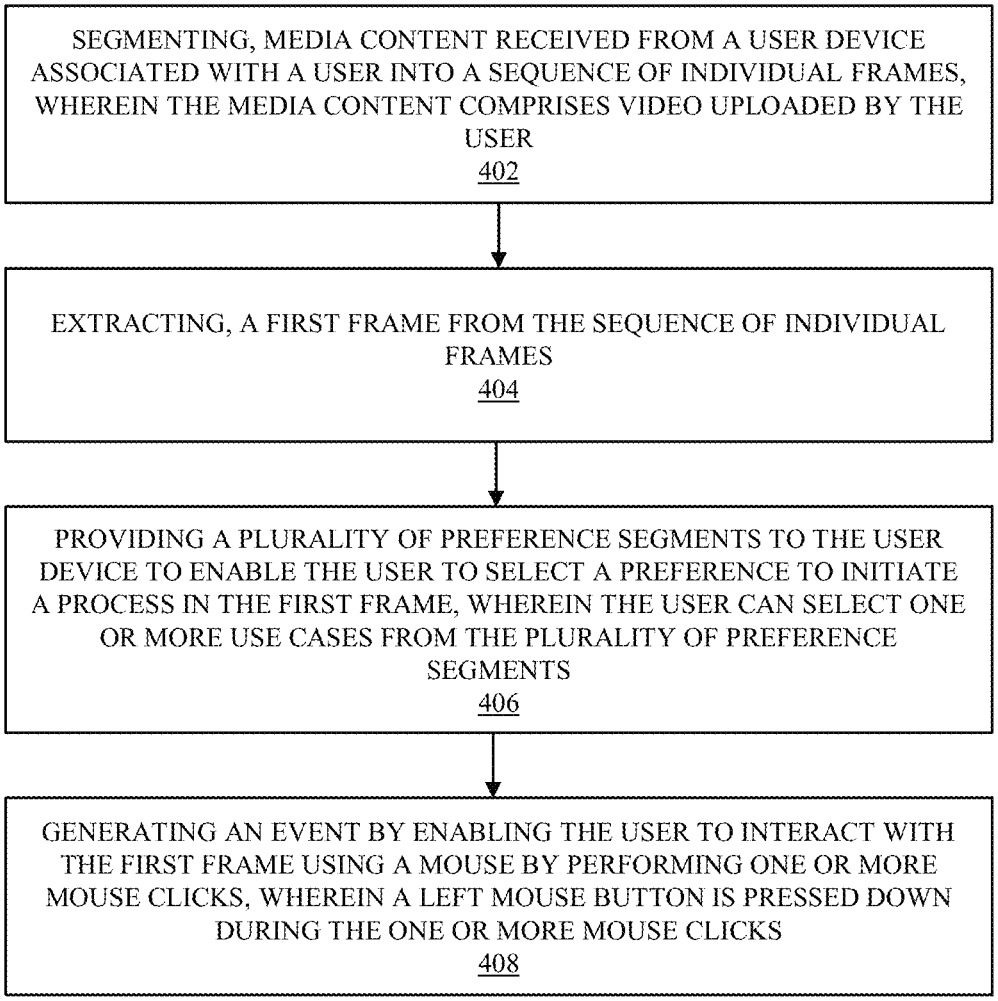
FIGS. 4A and 4B are flow diagrams that illustrate a method for personalizing a computer vision (CV) model based on use cases according to an embodiment herein.
Figure 4B:
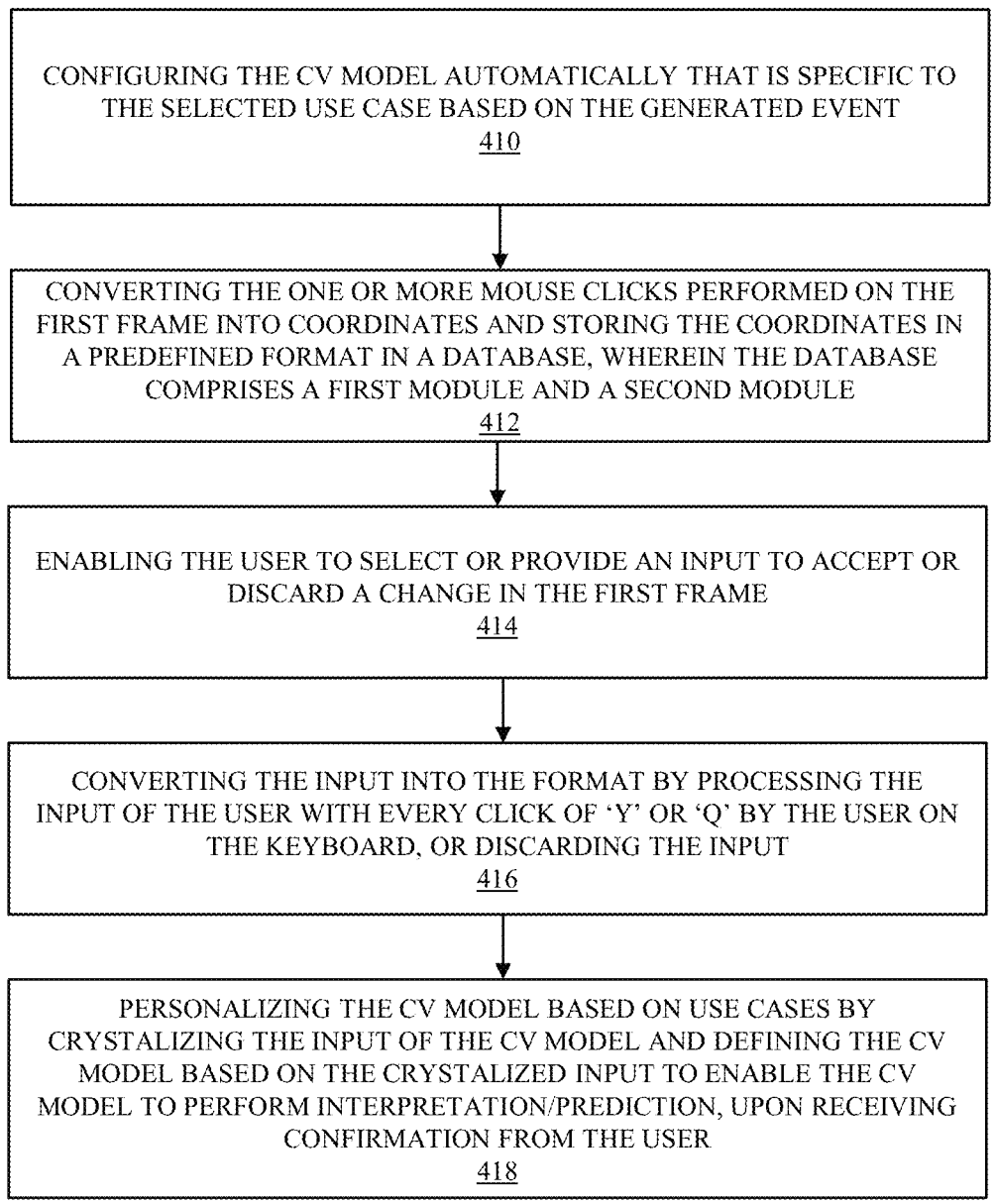

FIGS. 4A and 4B are flow diagrams that illustrate a method for personalizing a computer vision (CV) model based on use cases according to an embodiment herein. At step 402, The method includes segmenting media content received from a user device 102 associated with a user into a sequence of individual frames, wherein the media content comprises video uploaded by the user. At step 404, The method includes extracting a first frame from the sequence of individual frames. At step 406, The method includes providing a plurality of preference segments to the user device 102 to enable the user to select a preference to initiate a process in the first frame, wherein the user can select one or more use cases from the plurality of preference segments. At step 408, the method includes generating an event by enabling the user to interact with the first frame using a mouse 116 by performing one or more mouse clicks, wherein a left mouse button is pressed down during the one or more mouse clicks. At step 410, the method includes configuring the CV model automatically that is specific to the selected use case based on the generated event. At step 412, the method includes converting one or more mouse clicks performed on the first frame into coordinates and storing the coordinates in a predefined format in a database 118, wherein the database 118 comprises a first module and a second module. At step 414, the method includes enabling the user to select or provide an input to accept or discard a change in the first frame. At step 416, the method includes converting the input into the format by processing the input of the user with every click of 'Y' or 'Q' by the user on the keyboard, or discarding the input. At step 418, the method includes personalizing the CV model based on use cases by crystallizing the input of the CV model and defining the CV model based on the crystallized input to enable the CV model to perform interpretation/prediction, upon receiving confirmation from the user.

The method provides a platform that enables non-technical users to configure, run, understand, and visualize computer vision models seamlessly, catering to the unique needs of various industries. The method offers an end-to-end no-code solution, allowing the users to seamlessly run/configure computer vision models without the need for programming expertise. This simplifies the entire process from model deployment to execution. The method specifically executes computer vision model 112 on videos. This method expands the application of AI models beyond static images, catering to the dynamic nature of video data. Users can effortlessly define their rules, regions of interest, and use cases without delving into code. The user interface enables users to specify parameters through simple clicks and mouse drags, fostering a no-code environment for customization. The method offers flexibility in handling video input sources. Users can seamlessly run computer vision models on default videos, upload their videos, or provide camera details. This adaptability ensures users can leverage the best computer vision models effortlessly, all within a no-code framework. Users have the power to customize their AI applications intuitively.

By utilizing mouse clicks and drags, the users can effortlessly define regions of interest, rules, and other parameters, empowering them to tailor AI models to their specific requirements. The method not only runs AI models but also provides a visual representation of their outputs. Users can easily comprehend and analyze the results, facilitating a deeper understanding of the model's performance without delving into complex coding or technical details. Users can run the most effective AI models by either utilizing default models integrated into the system, or uploading their own models. This flexibility ensures that users can choose the best-suited models for their specific applications, contributing to enhanced performance and accuracy.

By eliminating the need for coding, the method empowers a broader audience, including those without technical backgrounds. This democratization of AI usage ensures that individuals from various domains can harness the potential of computer vision without programming complexities. The method seamlessly integrates user-defined inputs into the AI model pipeline. This ensures a smooth flow of information, allowing users to dictate the rules, regions of interest, and other parameters that influence the model's behavior, all within an intuitive no-code framework. Through a user-friendly interface, the method offers visualization tools that enhance user understanding. Users can interact with the results, gaining insights and making informed decisions without grappling with the intricacies of coding.

Figure 5:
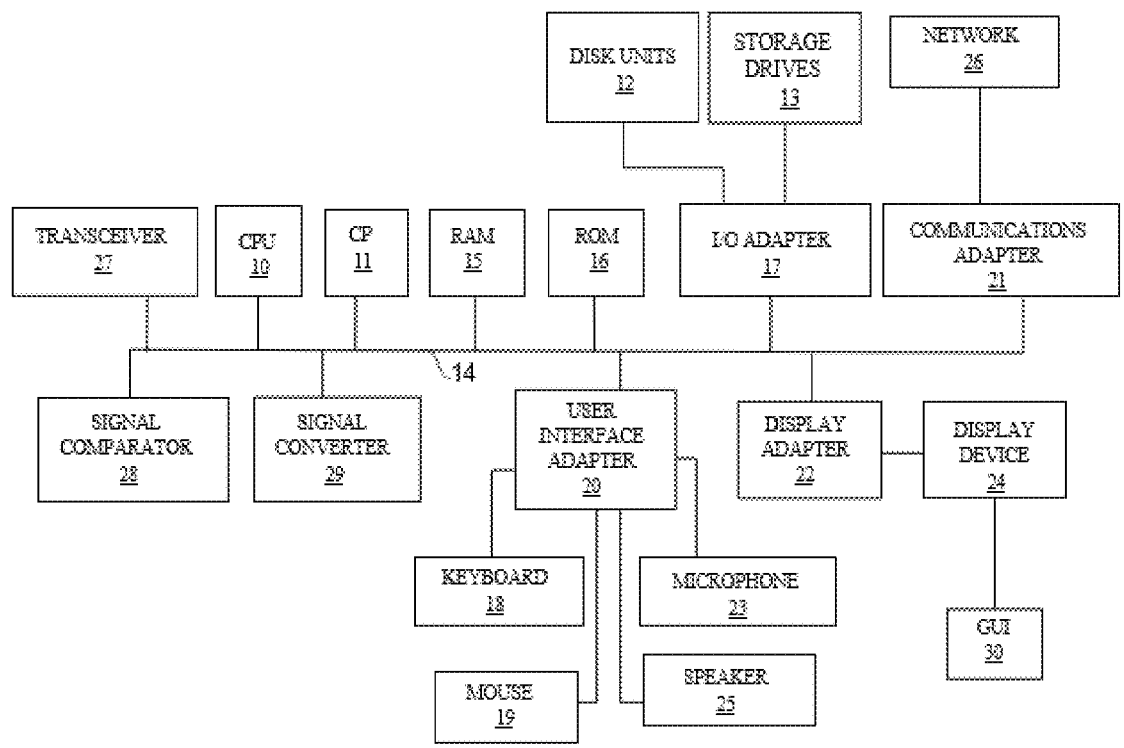
FIG. 5 is a schematic diagram of a system in accordance with the embodiments herein.

A representative hardware environment for practicing the embodiments herein is depicted in FIG. 5, with reference to FIGS. 1 through 4. This schematic drawing illustrates a hardware configuration of a system 100/a server/computer system/computing device in accordance with the embodiments herein. The system 100 includes at least one processing device CPU 10 that may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and storage drives 13 that are readable by the system. The system can read the inventive instructions on the storage drives 13 and follow these instructions to execute the methodology of the embodiments herein. The system further includes a user interface adapter 20 that connects a keyboard 18, mouse 19, speaker 25, microphone 23, and/or other subject interface devices such as a touch screen device (not shown) to the bus 14 to gather subject input. Additionally, a communication adapter 20 connects the bus 14 to a data processing network 26, and a display adapter 22 connects the bus 14 to a display device 24, which provides a graphical subject interface (GUI) 30 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of appended claims.

What is claimed is:

1. A method for personalizing a computer vision (CV) model based on use cases, wherein the method comprises:
   segmenting, videos received from a user device associated with a plurality of users into a sequence of individual frames, wherein the videos are at least one of default videos, user-uploaded videos, or the videos captured using provided camera details;
   extracting, a first frame from the sequence of individual frames to initiate a computer vision model process, wherein the first frame is configured to enable tracking of coordinates based on user inputs;
   generating an event in response to user interaction with the first frame, wherein the user interaction comprises one or more user inputs performed using one or more input devices;
   generating a plurality of preference segments to a plurality of user interfaces of the user device to enable the user to select a preference to initiate the use cases, wherein the user is enabled to select at least one of a first use case, or a second use case from among the plurality of preference segments;
   configuring corresponding computer vision (CV) models personalized for each selected use case in parallel by processing the selection the first use case and the second use case;
   tracking the coordinates within the first frame based on the one or more user inputs using the one or more input devices based on the configured CV model;
   converting the one or more user inputs performed within the first frame using the one or more input devices into the coordinates, wherein the coordinates are stored in a database in a predefined format;
   processing the coordinates stored in the database into a corresponding CV model, wherein the database comprises a first module and a second module;
   allowing the user to provide an input, through the one or more input devices to accept or discard a change in the first frame;
   defining a plurality of parameters comprising at least one of a region of interest or a line control in the first frame; and
   executing the first use case and the second use case by utilizing at least one of the default models associated with the system, or generated user-specific CV models, wherein the generated user-specific CV models are dynamically configured to generate a new CV model based on user-defined parameters.

2. The method of claim 1, wherein the method comprises pre-processing the first frame using at least one pre-processing technique to match a specific shape, size, and dimensions suitable for display on the user device.

3. The method of claim 1, wherein the first frame is standardized to a predetermined format to enable tracking of click event coordinates.

4. The method of claim 1, wherein the media content of the pre-defined areas of the entity is captured using an image capturing device.

5. The method of claim 1, wherein the CV model is modularized to ensure that each part is connected in a pipeline, with the output from one stage passed to the next and any disruption in the pipeline triggers an appropriate error message.

6. The method of claim 1, wherein the first module serves as temporary storage, while the second module acts as permanent storage.

7. The method of claim 1, wherein the method comprises pressing 'y' on a keyboard stores the coordinates to the second module and the pressing 'q' on the keyboard stores the coordinates to the first module.

8. The method of claim 1, wherein the coordinates are stored in a hierarchical structure based on how they are stacked in the database.

9. A system for personalizing a computer vision (CV) model based on use cases, wherein the system comprises:
   a server that comprises:
      a memory that comprises set of instructions;
      a processor executes the set of instructions and is configured to:
         segment videos received from a user device associated with a plurality of users into a sequence of individual frames, wherein the videos are at least one of default videos, user-uploaded videos, or the videos captured using provided camera details;
         extract a first frame from the sequence of individual frames to initiate a computer vision model process, wherein the first frame is configured to enable tracking of coordinates based on user inputs;
         generate an event in response to user interaction with the first frame, wherein the user interaction comprises one or more user inputs performed using one or more input devices;
         generate a plurality of preference segments to a plurality of user interfaces of the user device to enable the user to select a preference to initiate the use cases, wherein the user is enabled to select at least one of a first use case, or a second use case from among the plurality of preference segments;
         configure corresponding computer vision (CV) models personalized for each selected use case in parallel by processing the selection the first use case and the second use case;
         track the coordinates within the first frame based on the one or more user inputs using the one or more input devices based on the configured CV model;
         convert the one or more user inputs performed within the first frame using the one or more input devices into the coordinates, wherein the coordinates are stored in a database in a predefined format;
         process the coordinates stored in the database into a corresponding CV model, wherein the database comprises a first module and a second module;
         allow the user to provide an input, through the one or more input devices, to accept or discard a change in the first frame;
         define a plurality of parameters comprising at least one of a region of interest or a line control in the first frame; and
         execute the first use case and the second use case by utilizing at least one of the default models associated with the system, or generated user-specific CV models, wherein the generated user-specific CV models are dynamically configured to generate a new CV model based on user-defined parameters.

10. The system of claim 9, wherein the processor is configured to pre-process the first frame using at least one pre-processing technique to match a specific shape, size, and dimensions suitable for display on the user device.

* * * * *